United States Patent [19]

Weber

[11] Patent Number: 5,077,831

[45] Date of Patent: Dec. 31, 1991

[54] SAFEGUARD DEVICE WITH CODED TRANSMITTED SIGNAL

[75] Inventor: Hans-Werner Weber, Ingolstadt, Fed. Rep. of Germany

[73] Assignee: Telefunken electronic GmbH, Fed. Rep. of Germany

[21] Appl. No.: 412,142

[22] Filed: Sep. 25, 1989

[30] Foreign Application Priority Data

Sep. 27, 1988 [DE] Fed. Rep. of Germany ....... 3832667

[51] Int. Cl.[5] .......................... H04B 1/04; H04Q 3/02

[52] U.S. Cl. ........................................ 455/68; 455/70; 455/92; 455/114; 340/825.31; 340/825.72

[58] Field of Search ...................... 455/68, 70, 92, 151, 455/352, 114, 119, 108, 109, 95, 302, 307, 317; 340/825.31, 825.32, 825.34, 825.69, 825.72, 825.75, 543, 539

[56] References Cited

U.S. PATENT DOCUMENTS

| | | | |
|---|---|---|---|
| 4,247,850 | 1/1981 | Marcus . | |
| 4,463,340 | 7/1984 | Adkins et al. | 340/64 |
| 4,529,980 | 7/1985 | Liotine et al. | 340/825.52 |
| 4,786,900 | 11/1988 | Karasawa et al. | 340/825.31 |
| 4,878,052 | 10/1989 | Schulze | 340/825.69 |

FOREIGN PATENT DOCUMENTS

| | | |
|---|---|---|
| 2648187 | 4/1978 | Fed. Rep. of Germany . |
| 2828755 | 1/1980 | Fed. Rep. of Germany . |
| 3006128 | 8/1981 | Fed. Rep. of Germany . |
| 3232114 | 3/1983 | Fed. Rep. of Germany . |
| 3213271C | 10/1983 | Fed. Rep. of Germany . |
| 3516613 | 11/1986 | Fed. Rep. of Germany . |
| 2503428 | 10/1982 | France . |
| 2135487A | 8/1984 | United Kingdom . |
| 2186404 | 8/1987 | United Kingdom . |

OTHER PUBLICATIONS

Search Report of the Federal Republic of Germany Patent Office for Application 38 32 667.1, filed 9/27/1988, Report dated 2/16/89.

*Primary Examiner*—Reinhard J. Eisenzopf
*Assistant Examiner*—Chi H. Pham
*Attorney, Agent, or Firm*—Spencer & Frank

[57] ABSTRACT

A safeguard device having a transmitter produces a high-fequency signal modulated with a code signal word and a receiver having an alarm device is controlled thereby. To protect the transmitter from unauthorized use and to achieve an expansion of its utility, a switching device is provided having a memory for storing a code word and an input unit for a password. The switching device includes a comparing device and code signal generator. The comparing device enables the transmitter when an input password matches with a stored code word. The code signal generator selectively produces either an alarm or a reset code signal word to modulate a high-frequency signal. When the transmitter is switched to the active transmitting state, the appropriately modulated high-frequency signal is emitted. At the receiver, the alarm device is either activated or switched off depending on the code signal word received.

6 Claims, 1 Drawing Sheet

SAFEGUARD DEVICE WITH CODED TRANSMITTED SIGNAL

BACKGROUND OF THE INVENTION

The invention relates to a safeguard device having a transmitter, in particular a hand transmitter, for emission of a high-frequency signal with a modulating code signal word, and having an adapted receiver containing a controllable alarm device.

A safeguard device of this type has been proposed in which a transmitter is provided for emission of a high-frequency signal that is modulated with a code signal word, i.e. a pulse sequence of determined frequency or a certain pulse duration pattern. The safeguard device also includes an adapted receiver designed for reception and demodulation/decoding of the signal words emitted by the transmitter. When a coded HF signal having a defined information content is present, an alarm device allocated to the receiver is triggered.

SUMMARY OF THE INVENTION

The object of the invention is to provide a safeguard device of the type mentioned above such that unauthorized use of the transmitter is rendered more difficult and its usefulness is expanded.

According to the invention, there is provided a safeguard device of the type mentioned above in which the transmitter has a switching device with a memory for a code word and an input unit for a password, with the switching device further including a comparing device and a code signal generator. The comparing device activates a control circuit for the code signal generator when the password matches with the code word. The code signal generator can generate two code signal words associated with the code word, and upon generation of each of the code signal words, the transmitter is activated and modulated with the selected code signal word. The coded high-frequency signal received in the receiver activates or deactivates the alarm device depending on the triggered code signal word.

In accordance with the invention, emission of a high-frequency signal modulated with a code signal word is not possible until an entered password matches with a stored code word. Each code word has a pair of code signal words associated with it that are preset in a code signal generator and can be called up. By selective control of the code signal generator, the appropriate code signal word is generated and at the same time generation of the high-frequency signal modulated by the generated code signal word is activated code signal words of the pair contain information for an alarm signal and information for a reset signal respectively. In the adapted receiver, demodulation or decoding apparatus are accordingly provided to decode the code signal words and either activate an allocated alarm device or deactivate the alarm device by switching it off using the reset signal. The user of the transmitter, identified as being authorized by the password, is therefore able to activate a transmitter, attached to a person or to goods, for example, that is to activate its alarm device or thereafter to deactivate it again.

In order to minimize the energy consumption by a battery-powered transmitter, the switching device allocated to the transmitter is provided with a timer switch. Whenever switch-on takes place, one of the code signal words is restarted and the transmission readiness of the transmitter is maintained for a stipulated period. After expiration of this period, the supply circuit is switched off and cannot be restored to the condition in which the modulated high-frequency signal can be emitted until the password has been entered. This ensures that the transmitter is set automatically to the non-usable condition when the authorized user has moved away from the transmitter or there is no need to use the transmitter. The stored code word is preferably also changeable, and a pair of code signal words allocated to each of these code words. This permits use of a transmitter for different receivers set for different code signal words. A multi-digit switch is preferably provided on the transmitter for entering the password, with which the digits of the password can be entered consecutively, with one digit of the password determining the pair of code signal words.

Separate pushbutton switches for an alarm signal and for a reset signal are preferably allocated in the transmitter for calling up the proper code signal word. The switching device provided in the transmitter preferably has a microprocessor that determines the switching position of the pushbutton switches using control lines, and using the microprocessor the appropriate code signal word is then generated in the code signal generator depending on the pushbutton switch actuated.

BRIEF DESCRIPTION OF THE DRAWINGS

The invention will now be described in greater detail on the basis of an embodiment of the safeguard device in accordance with the invention, in conjunction with FIG. 1, this figure being a block diagram of an embodiment.

DESCRIPTION OF THE PREFERRED EMBODIMENTS

Figure 1:
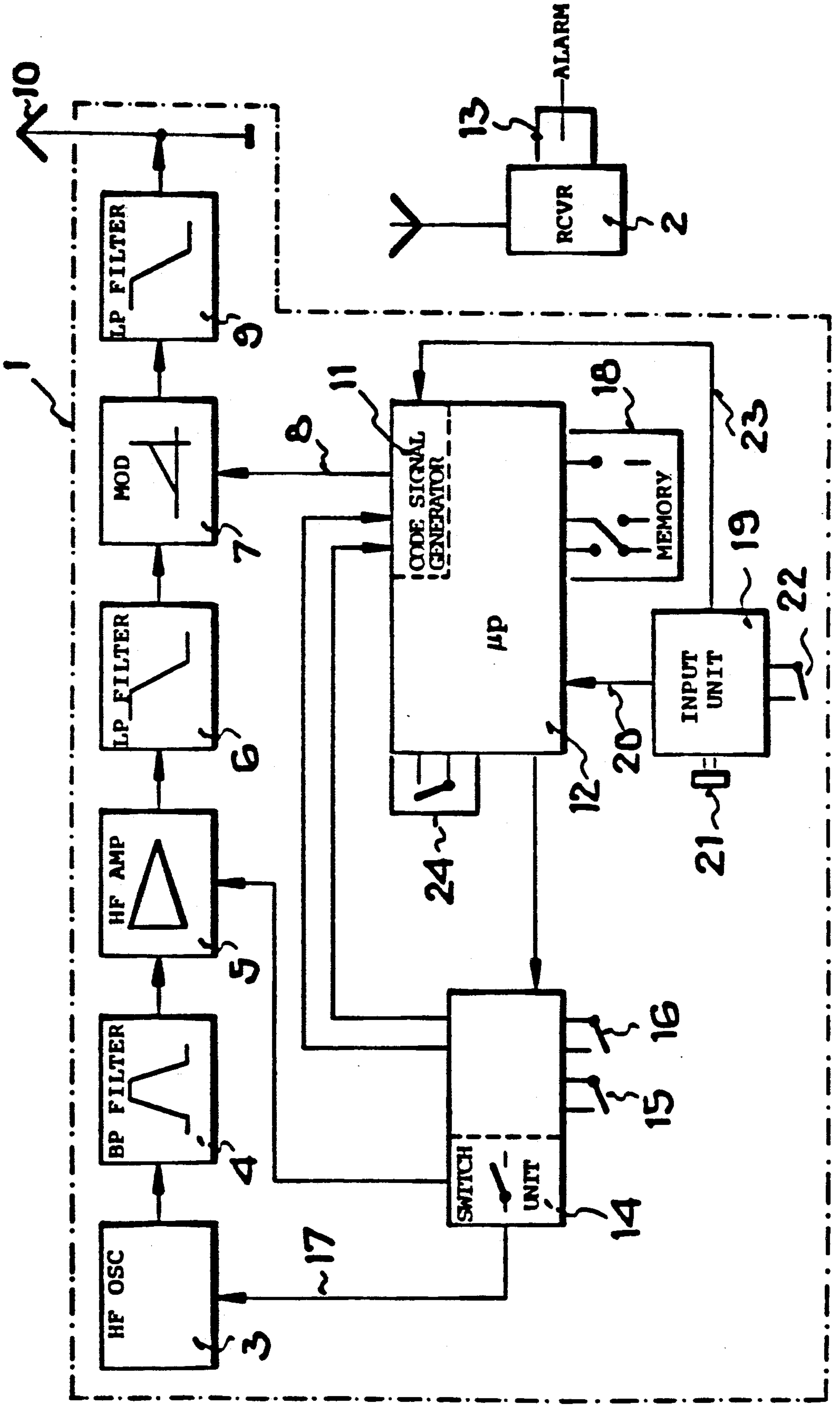

A safeguard device according to an embodiment the invention includes a transmitter 1, realized in the present invention by the components arranged within a dash-dotted line, and an adapted receiver 2. The high-frequency part of transmitter 1 comprises a high-frequency oscillator 3 which is connected to a band-pass filter 4 tuned to the oscillation frequency of the oscillator. The oscillator signal, thus freed in particular of harmonic and subharmonic or other disturbing frequencies, then passes to a high-frequency amplifier 5 whose power-amplified output signal passes to a low-pass filter 6 whose limit frequency is tuned to the oscillator basic frequency. In the low-pass filter 6, harmonic oscillations are separated that might result from non-linearities in the amplifier 5. After the low-pass filter 6, the power-amplified high-frequency signal is connected to a modulator 7 that contains pin diodes as modulation elements and thereby permits a very high degrees of modulation, possibly reaching 100%. The modulator 7 is additionally supplied via a special line 8 with a code signal word by which the high-frequency signal is modulated in modulator 7. The high-frequency signal thus modulated with information contained in the code signal word then passes via a further low-pass filter 9 to a transmitting antenna 10. The limit frequency of the second low-pass filter 9 is also tuned to the oscillator basic frequency in conjunction with the modulating code signal word and considerably damps frequencies above the useful signal. The transmitter thus constructed has, as a result of the filter circuits 4, 6, 9 inserted into the high-frequency signal system, a very high subsidiary supression factor, so that in conformity with the relevant regulations, no non-permissible stray radiation is emitted via the antenna 10. The modulator 7 affords an optimum adaptation to the low-pass filters 6, 9 with high degrees of modulation.

The modulation signal fed into the modulator 7 via the line 8 is a code signal word generated in a code signal generator 11. It preferably includes a preselected sequence of pulses of a certain frequency, however the pulses can also have different widths or amplitudes. The code signal generator 11 is part of a microprocessor 12 programmed for control of the transmitter.

Within the safeguard device, the transmitters 1 is used to reach certain intended receivers 2 for demodulation of the transmitted code word. For identification, an acoustic or visual alarm device 13 is allocated to the receiver, so that an adapted receiver 2 coming within the transmission range of the transmitter 1 activates its alarm via a decoder (not shown) when the transmitter emits the appropriate alarm signal. If transmitter 1 by contrast emits a reset signal, then the alarm device 13 in the responding receiver 2 is deactivated after appropriate demodulation or decoding in the decoder. In order to trigger the code signal words corresponding to the alarm signal or to the reset signal, an activation switching unit 14 located in the transmitter that has a manually actuatable pushbutton switch 15 for initiation of an alarm signal and a manually actuatable pushbutton switch 16 for initiation of a reset signal. By operating the alarm pushbutton switch 15, a control signal is emitted to the code signal generator 11, which thereupon generates a code signal word that eventually activates the alarm device 13 in receiver 2. If by contrast the reset pushbutton switch 16 is pressed, the code signal generator 11 is controlled so that it generates a reset signal which is intended to reset or switch off the alarm device 13 in receiver 2. Simultaneously with operation of one of the pushbutton switches 15, 16, a supply circuit 17 is also switched through by the activation unit 14, so that oscillator 3 and amplifier 5 are activated. The thereby generated power high-frequency signal is then modulated with the appropriate code signal word selected using the pushbutton switch 15 or 16, and emitted by the transmitting antenna 10.

However, to prevent the transmitter 1 from being used by unauthorized persons, the microprocessor 12 is allocated a memory 18 for storing a code word. The pair of code signal words stored in memory 18, to which the receiver 2 is tuned, is determined using switching paths that can be connected as required and which, while entering the comparative value, are monitored using the microprocessor 12. In addition, however, the code word is also used to set readiness for transmission of the actual transmitter system 3 to 10. The code word stipulated in memory 18 is compared in microprocessor 12 with a password that can be generated with a manually operatable input unit 19 and that passes to the microprocessor 12 via a password line 20. The input unit 19 includes a multi-digit switch 21 which the user can use to enter a preselected password and switch to the password line 20 using an acknowledge key 22. The number code thereby generated and representing the password 20 puts the code signal generator 11 into a ready state via a standby line 23. Only then can the pushbutton switch 15 or 16, monitored by the microprocessor, be operated in order to put the code signal generator 11 into the transmitting state while simultaneously connecting the oscillator 3 and the amplifier 5 to the appropriate supply voltage.

To automatically deactivate the transmission readiness of the transmitter 1, if neither an alarm signal nor a reset signal has been given during a preselected time, a timer switch 24 is connected to the switching device 12, 14 19 in the transmitter, preferably connected to the microprocessor 12. This timer switch 24 is restarted whenever one of the code words is switched on, i.e. when one of the pushbutton switches 15, 16 is operated, and permanently switches off the supply circuit of the transmitter 1 after the set duration. The transmitter 1 can then only be put back into readiness for transmission by re-entering the password.

What is claimed is:

1. A safeguard device comprising:

transmitter means, including a modulator, for emission of a high-frequency signal modulated by a code signal word;

receiver means, containing a controllable alarm device, for receiving and decoding the modulated high frequency signal and for activating and resetting said alarm device in response to a respective predetermined received code signal word; and switching means for controlling said transmitter means, said switch means including memory means for storing code words each associated with a pair of code signal words, input means for inputting a password, comparing means for comparing an input password with said stored code words and for producing a control signal upon a positive comparison, code signal generator means, having its output connected to said modulator, for selectively generating one of a pair of code signal words associated with a code word, and activating switch means, responsive to said control signal from said comparing means, for activating said transmitter means and for selectively causing said code generator means to generate a selected one of said pair of code signal words associated with the compared code word, whereby said receiver means, depending on the selected one of the pair of code signal words transmitted, activates or deactivates said alarm device.

2. A safeguard device according to claim 1, wherein said switching means further includes timing means for deactivating the transmitter means after a predetermined time period, which time period is restarted whenever one of said code signal words is selectively generated.

3. A safeguard device according to claim 1, wherein said stored code words are changeable and wherein each of said code words is associated with a pair of code signal words.

4. A safeguard device according to claim 1, wherein said activating swtich means includes separate pushbutton switches for selecting either an alarm or a reset code signal word, and wherein said switching means includes a microprocessor that monitors the switching position of said pushbutton switches;

whereby the appropriate code signal word is then generated by said code signal generator means depending on the switching position of said pushbutton switches.

5. A safeguard device according to claim 1, wherein said receiver has a decoder which receives a demodulated signal based on the high-frequency signal transmitted by said transmitter and switches said alarm device on or off depending on which of said code signal words modulates the high-frequency signal.

6. A safeguard device according to claim 1, wherein said transmitter means comprises:

a high frequency oscillator having a basic frequency for producing an output signal responsive to said activating switch means;

a band-pass filter turned to said high frequency oscillator's basic frequency for receiving said oscillator's output signal and producing a filtered output signal;

a high frequency amplifier for receiving the filtered output signal from said band-pass filter and producing an amplified output signal;

a first low-pass filter having a limit frequency turned to the oscillator basic frequency for receiving the amplified output signal from said high frequency amplifier and producing an output signal;

said modulator being a pin diode modulator for receiving and modulating the output signal from said first low-pass filter with a code signal word received from said code signal word generating means and producing a modulated output signal; and a second low-pass filter having a limit frequency tuned to the oscillator basic frequency for receiving the modulated output signal from said pin diode modulator and producing an output signal to an antenna.

* * * * *